(12) United States Patent
Gilbert et al.

(10) Patent No.: US 7,881,258 B2
(45) Date of Patent: Feb. 1, 2011

(54) MECHANISM FOR STREAMING MEDIA DATA OVER WIDEBAND WIRELESS NETWORKS

(75) Inventors: Jeffrey M. Gilbert, Palo Alto, CA (US);
Kannan Ramchandran, El Cerrito, CA (US); Guocong Song, San Jose, CA (US)

(73) Assignee: Sibeam, Inc., Sunnyvale, CA (US)

( * ) Notice: Subject to any disclaimer, the term of this patent is extended or adjusted under 35 U.S.C. 154(b) by 631 days.

(21) Appl. No.: 11/689,386

(22) Filed: Mar. 21, 2007

(65) Prior Publication Data

US 2007/0223380 A1  Sep. 27, 2007

Related U.S. Application Data

(60) Provisional application No. 60/785,361, filed on Mar. 22, 2006.

(51) Int. Cl.
*H04W 4/00* (2009.01)
*H04W 72/00* (2009.01)
*G06F 15/16* (2006.01)

(52) U.S. Cl. .................. 370/329; 370/465; 455/450; 709/231

(58) Field of Classification Search ................ 370/310, 370/328, 329, 431, 464, 465, 468; 455/422.1, 455/445–453; 709/219, 231, 238, 240
See application file for complete search history.

(56) References Cited

U.S. PATENT DOCUMENTS

| | | | |
|---|---|---|---|
| 4,891,803 A * | 1/1990 | Huang et al. ............... | 370/411 |
| 6,697,441 B1 * | 2/2004 | Bottomley et al. .......... | 375/340 |
| 6,879,845 B2 * | 4/2005 | Suzuki et al. ............... | 370/321 |
| 7,164,725 B2 * | 1/2007 | Frank ......................... | 370/338 |
| 2004/0209579 A1 | 10/2004 | Vaidyanathan | |
| 2006/0146153 A1 * | 7/2006 | Xia et al. .................... | 348/272 |

FOREIGN PATENT DOCUMENTS

| | | |
|---|---|---|
| EP | 0884913 A2 | 12/1998 |
| EP | 1301041 A1 | 4/2003 |
| WO | WO-0169814 A1 | 9/2001 |
| WO | WO-0195512 A1 | 12/2001 |
| WO | WO-02052860 A1 | 4/2002 |
| WO | WO-02069443 A1 | 9/2002 |
| WO | WO-2005029867 A1 | 3/2005 |

OTHER PUBLICATIONS

International Search Report for PCT Patent Application No. PCT/US2007/007263, 4 Pgs.
Written Opinion of the International Searching Authority for PCT Patent Application No. PCT/US2007/007263, 8 Pgs.

* cited by examiner

*Primary Examiner*—Aung S Moe
*Assistant Examiner*—Kerri M Rose
(74) *Attorney, Agent, or Firm*—Blakely, Sokoloff, Taylor & Zafman LLP

(57) ABSTRACT

A system is disclosed having a transmitter to wirelessly transmit multi-media data. The transmitter includes a module to packetize phase units of a multimedia frame that is to be transmitted. The system also includes a receiver to receive the multimedia frame received from the transmitter. The receiver includes a post processing module to perform error concealment on the phase units.

32 Claims, 5 Drawing Sheets

MECHANISM FOR STREAMING MEDIA DATA OVER WIDEBAND WIRELESS NETWORKS

This non provisional application claims priority to and incorporates by reference the provisional application Ser. No. 60/785,361, filed on Mar. 22, 2006 and claims priority thereof.

FIELD OF INVENTION

An embodiment of the invention relates to wireless communication, and more specifically, to the transfer of multimedia data.

BACKGROUND

Due to its voluminous size, multimedia data (e.g., high-resolution images, video, high-definition TV) is extremely demanding of bandwidth resources. Thus, there is a critical need to compress multimedia data to facilitate delivery over bandwidth-constrained transmission mediums. Currently, there are various mechanisms that implement media compression.

In particular, there are there are several commercial standards for image and video compression, including JPEG, JPEG-2000, and JPEG-LS for image compression, and MPEG-1,2,4, and H.26x family of standards for video compression. Both lossless (e.g., JPEG-LS) and lossy (e.g., JPEG, MPEG) are covered under these standards.

When transmitting multimedia data over noisy transmission mediums such as wireless networks, there is often a need for both compression (to satisfy the bandwidth constraints) and robustness (to overcome the noisy transmission medium). The latter is classically accomplished through the use of forward error correction (FEC) methods (such as Reed-Solomon codes, turbo codes, LDPC codes, etc.) and/or through retransmission of lost packets in case there is (as in TCP/IP networks). Retransmission schemes ensure reliability. However, retransmission occurs at the cost of delays and buffering requirements at both transmitter and receiver, which may be prohibitive or even unacceptable in many applications.

Even if compression is not employed, optimizing the transmission delivery for the delivery of video formats is critical for achieving superior performance, but this is not included in existing source and channel coding technology.

Thus, conventional mechanisms in the field of media transmission over wireless networks involve a separation of the tasks of source coding (using state-of-the-art compression technology like H.264 and MPEG-2), channel coding (using state-of-the-art methods like LDPC and turbo codes), or retransmitting lost data in the presence of channel feedback. Such schemes are not a good fit for low-complexity and low-latency applications.

SUMMARY

A method, system and apparatus for streaming media data over wideband wireless networks are described. In one embodiment, the system comprises a transmitter and a receiver, where the transmitter comprises a phased-array antenna to wirelessly transmit media data using beamforming and a first module coupled to the phased-array antenna to packetize phases of media data and to determine a prioritized transmission order to transmit the packetized phases using the phased-array antenna. The receiver receives the packetized phases from the transmitter and has a post processing module to perform error concealment on data in received packetized phases.

DESCRIPTION OF THE DRAWINGS

The invention may be best understood by referring to the following description and accompanying drawings that are used to illustrate embodiments of the invention. In the drawings:

FIG. 3 illustrates one embodiment of an image frame; and

FIG. 4 illustrates another embodiment of an image frame.

DETAILED DESCRIPTION

Figure 1:
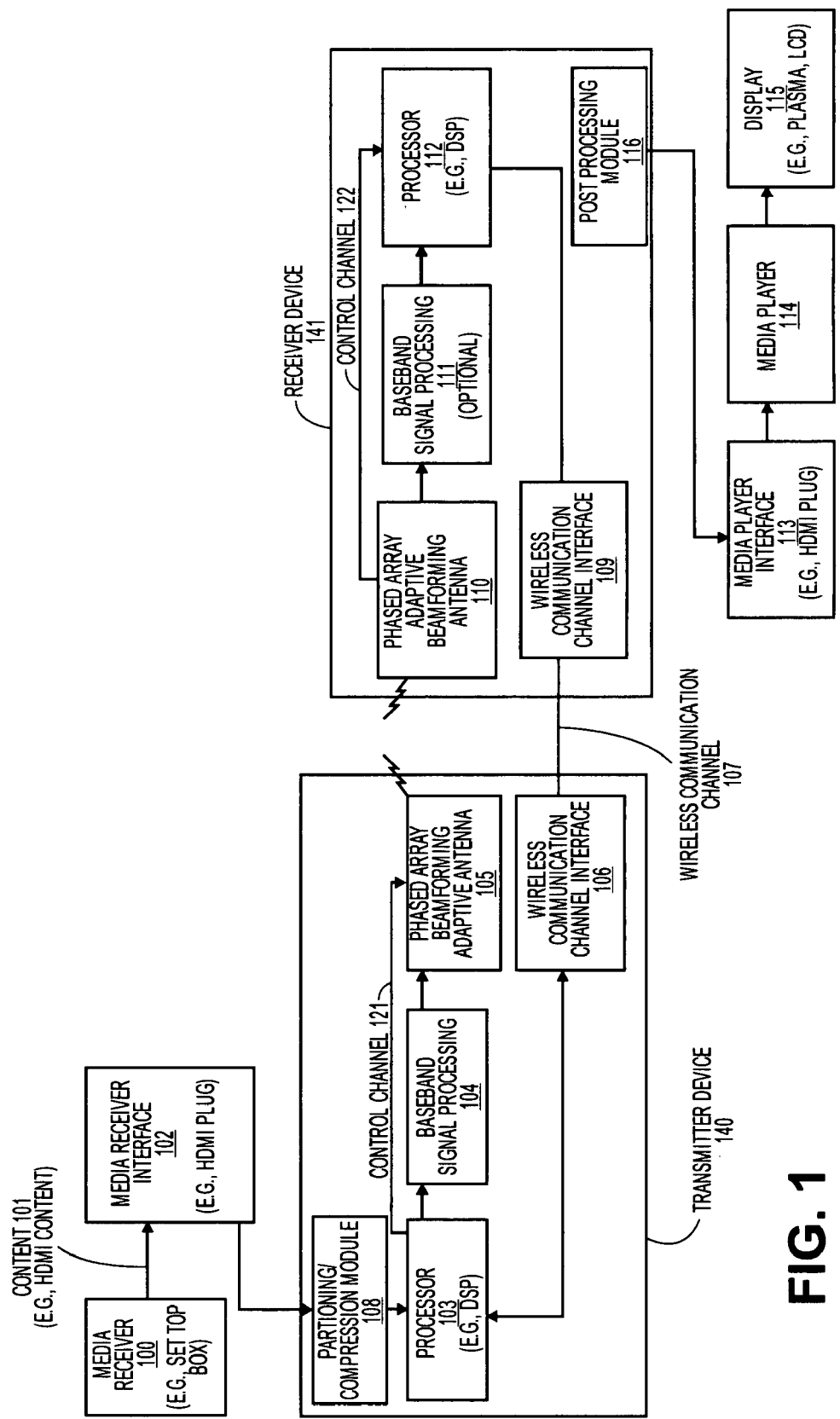
FIG. 1 is a block diagram of one embodiment of a communication system.

A mechanism providing the robust, efficient and low-latency delivery of media data over wideband wireless networks is disclosed. According to one an embodiment, compression, data partitioning, and post-processing (e.g., spatio-temporal interpolation and error-concealment) mechanisms are combined. In a further embodiment, the combined application layer mechanisms are coupled with physical layer components, such as multi-antenna beamforming patterns in multiple-input multiple-output or MIMO wireless systems, as well as physical layer Forward Error Correction (FEC) code strengths that are matched to Quality of Service (QoS) parameters of the—layer media content.

In the following description, numerous details are set forth. It will be apparent, however, to one skilled in the art that embodiments of the present invention may be practiced without these specific details. In other instances, well-known structures, devices, and techniques have not been shown in detail, in order to avoid obscuring the understanding of the description. The description is thus to be regarded as illustrative instead of limiting.

Reference in the specification to "one embodiment" or "an embodiment" means that a particular feature, structure, or characteristic described in connection with the embodiment is included in at least an embodiment of the invention. The appearances of the phrase "in one embodiment" in various places in the specification are not necessarily all referring to the same embodiment.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

An Example of a Communication System

FIG. 1 is a block diagram of one embodiment of a communication system. Referring to FIG. 1, the system comprises media receiver 100, a media receiver interface 102, a transmitting device 140, a receiving device 141, a media player interface 113, a media player 114 and a display 115.

Media receiver 100 receives content from a source (not shown). In one embodiment, media receiver 100 comprises a set top box. The content may include baseband digital video, such as, for example, but not limited to, content adhering to the HDMI or DVI standards. In such a case, media receiver 100 may include a transmitter (e.g., an HDMI transmitter) to forward the received content.

Media receiver 101 sends content 101 to transmitter device 140 via media receiver interface 102. In one embodiment, media receiver interface 102 includes logic that converts content 101 into HDMI content. In such a case, media receiver interface 102 may include an HDMI plug and content 101 is sent via a wired connection; however, the transfer could occur through a wireless connection. In another embodiment, content 101 includes DVI content.

In one embodiment, the transfer of content 101 between media receiver interface 102 and transmitter device 140 occurs over a wired connection; however, the transfer could occur through a wireless connection.

Transmitter device 140 wirelessly transfers information to receiver device 141 using two wireless connections. One of the wireless connections is through a phased array antenna with adaptive beamforming. The other wireless connection is via wireless communications channel 107, referred to herein as the back channel. In one embodiment, wireless communications channel 107 is unidirectional. In an alternative embodiment, wireless communications channel 107 is bi-directional.

Receiver device 141 transfers the content received from transmitter device 140 to media player 114 via media player interface 113. In one embodiment, the transfer of the content between receiver device 141 and media player interface 113 occurs through a wired connection; however, the transfer could occur through a wireless connection. In one embodiment, media player interface 113 comprises an HDMI plug. Similarly, the transfer of the content between media player interface 113 and media player 114 occurs through a wired connection; however, the transfer could occur through a wireless connection.

Media player 114 causes the content to be played on display 115. In one embodiment, the content is HDMI content and media player 114 transfer the media content to display via a wired connection; however, the transfer could occur through a wireless connection. Display 115 may comprise a plasma display, an LCD), a CRT, etc.

Note that the system in FIG. 1 may be altered to include a DVD player/recorder in place of a DVD player/recorder to receive, and play and/or record the content.

In one embodiment, transmitter 140 and media receiver interface 102 are part of media receiver 100. Similarly, in one embodiment, receiver 140, media player interface 113, and media player 114 are all part of the same device. In an alternative embodiment, receiver 140, media player interface 113, media player 114, and display 115 are all part of the display.

In one embodiment, transmitter device 140 comprises a processor 103, an optional baseband processing component 104, a phased array antenna 105 a wireless communication channel interface 106, and a partitioning/compression module 108. Phased array antenna 105 comprises a radio frequency (RF) transmitter having a digitally controlled phased array antenna coupled to and controlled by processor 103 to transmit content to receiver device 141 using adaptive beamforming.

In one embodiment, receiver device 141 comprises a post processing module 116, a processor 112, an optional baseband processing component 111, a phased array antenna 110, and a wireless communication channel interface 109. Phased array antenna 110 comprises a radio frequency (RF) transmitter having a digitally controlled phased array antenna coupled to and controlled by processor 112 to receive content from transmitter device 140 using adaptive beamforming.

In one embodiment, processor 103 generates baseband signals that are processed by baseband signal processing 104 prior to being wirelessly transmitted by phased array antenna 105. In such a case, receiver device 141 includes baseband signal processing to convert analog signals received by phased array antenna 110 into baseband signals for processing by processor 112. In one embodiment, the baseband signals are orthogonal frequency division multiplex (OFDM) signals.

In one embodiment, transmitter device 140 and/or receiver device 141 are part of separate transceivers.

Transmitter device 140 and receiver device 141 perform wireless communication using phased array antenna with adaptive beamforming that allows beam steering. Beamforming is well known in the art. In one embodiment, processor 103 sends digital control information to phased array antenna 105 to indicate an amount to shift one or more phase shifters in phased array antenna 105 to steer a beam formed thereby in a manner well-known in the art. Processor 112 uses digital control information as well to control phased array antenna I 10. The digital control information is sent using control channel 121 in transmitter device 140 and control channel 122 in receiver device 141. In one embodiment, the digital control information comprises a set of coefficients. In one embodiment, each of processors 103 and 112 comprises a digital signal processor.

Wireless communication link interface 106 is coupled to processor 103 and provides an interface between wireless communication link 107 and processor 103 to communicate antenna information relating to the use of the phased array antenna and to communicate information to facilitate playing the content at another location. In one embodiment, the information transferred between transmitter device 140 and receiver device 141 to facilitate playing the content includes encryption keys sent from processor 103 to processor 112 of receiver device 141 and one or more acknowledgments from processor 112 of receiver device 141 to processor 103 of transmitter device 140.

Wireless communication link 107 also transfers antenna information between transmitter device 140 and receiver device 141. During initialization of the phased array antennas 105 and 110, wireless communication link 107 transfers information to enable processor 103 to select a direction for the phased array antenna 105. In one embodiment, the information includes, but is not limited to, antenna location information and performance information corresponding to the antenna location, such as one or more pairs of data that include the position of phased array antenna 110 and the signal strength of the channel for that antenna position. In another embodiment, the information includes, but is not limited to, information sent by processor 112 to processor 103 to enable processor 103 to determine which portions of phased array antenna 105 to use to transfer content.

When the phased array antennas 105 and 110 are operating in a mode during which they may transfer content (e.g., HDMI content), wireless communication link 107 transfers an indication of the status of communication path from the processor 112 of receiver device 141. The indication of the status of communication comprises an indication from processor 112 that prompts processor 103 to steer the beam in another direction (e.g., to another channel). Such prompting may occur in response to interference with transmission of portions of the content. The information may specify one or more alternative channels that processor 103 may use.

In one embodiment, the antenna information includes information sent by processor 112 to specify a location to which receiver device 141 is to direct phased array antenna 110. This may be useful during initialization when transmitter device 140 is telling receiver device 141 where to position its antenna so that signal quality measurements can be made to identify the best channels. The position specified may be an exact location or may be a relative location such as, for example, the next location in a predetermined location order being followed by transmitter device 140 and receiver device 141.

In one embodiment, wireless communications link 107 transfers information from receiver device 141 to transmitter device 140 specifying antenna characteristics of phased array antenna 110 or vice versa.

An Example of a Transceiver Architecture

Figure 2:
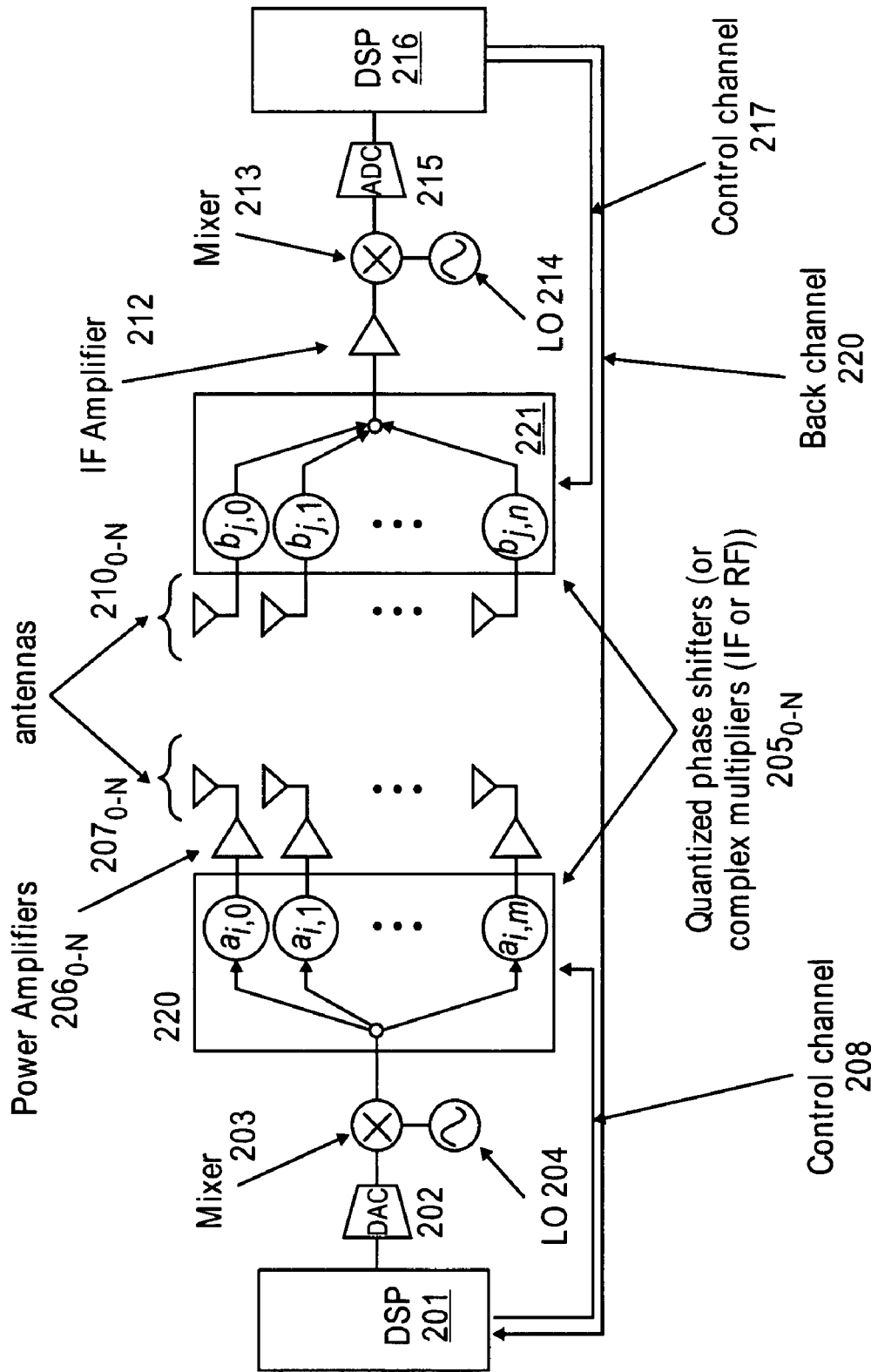
FIG. 2 is a more detailed block diagram of one embodiment of the communication system.

FIG. 2 is a block diagram of one embodiment of an adaptive beam forming multiple antenna radio system including transmitter device 140 and receiver device 141 of FIG. 1. Transceiver 200 includes multiple independent transmit and receive chains. Transceiver 200 performs phased array beam forming using a phased array that takes an identical RF signal and shifts the phase for one or more antenna elements in the array to achieve beam steering.

Referring to FIG. 2, Digital Signal Processor (DSP) 201 formats the content and generates real time baseband signals. DSP 201 may provide modulation, FEC coding, packet assembly, interleaving and automatic gain control. For purposes herein, a digital signal processor can refer either to a programmable processor which performs digital signal processing, fixed computational units which perform the digital signal processing, or any combination thereof.

DSP 201 then forwards the baseband signals to be modulated and sent out on the RF portion of the transmitter. In one embodiment, the content is modulated into OFDM signals in a manner well known in the art.

Digital-to-analog converter (DAC) 202 receives the digital signals output from DSP 201 and converts them to analog signals. In one embodiment, the signals output from DAC 202 are between 0 and about 1250 MHz signals and DAC 202 represents a pair of digital-to-analog converters for quadrature (I/Q) output.

Mixer 203 receives signals output from DAC 202 and combines them with a signal from a local oscillator (LO) 204. The signals output from mixer 203 are at an intermediate frequency. In one embodiment, the intermediate frequency is between 10-14 GHz.

Multiple phase shifters $205_{0-N}$ receive the output from mixer 203. A de-multiplexer is included to control which phase shifters receive the signals. In one embodiment, these phase shifters are quantized phase shifters. In an alternative embodiment, the phase shifters may be replaced by complex multipliers. In one embodiment, DSP 201 also controls, via control channel 208, the phase and magnitude of the currents in each of the antenna elements in phased array antenna 220 to produce a desired beam pattern in a manner well-known in the art. In other words, DSP 201 controls the phase shifters $205_{0-N}$ of phased array antenna 220 to produce the desired pattern.

Each of phase shifters $205_{0-N}$ produce an output that is sent to one of power amplifiers $206_{0-N}$, which amplify the signal. The amplified signals are sent to antenna array 207 which has multiple antenna elements $207_{0-N}$. In one embodiment, the signals transmitted from antennas $207_{0-N}$ are radio frequency signals between 56-64 GHz. Thus, multiple beams are output from phased array antenna 220.

With respect to the receiver, antennas $210_{0-N}$ receive the wireless transmissions from antennas $207_{0-N}$ and provide them to phase shifters $211_{0-N}$. As discussed above, in one embodiment, phase shifters $211_{0-N}$ comprise quantized phase shifters. Alternatively, phase shifters $211_{0-N}$ may be replaced by complex multipliers. Phase shifters $211_{0-N}$ receive the signals from antennas $210_{0-N}$, which are combined to form a single line feed output. In one embodiment, a multiplexer is used to combine the signals from the different elements and output the single feed line. The output of phase shifters $211_{0-N}$ is input to intermediate frequency (IF) amplifier 212, which reduces the frequency of the signal to an intermediate frequency. In one embodiment, the intermediate frequency is between 2-9 GHz.

Mixer 213 receives the output of the IF amplifier 212 and combines it with a signal from LO 214 in a manner well-known in the art. In one embodiment, the output of mixer 213 is a signal in the range of about 0-1250 MHz. In one embodiment, there are I and Q signals for each channel.

Analog-to-digital converter (ADC) 215 receives the output of mixer 213 and converts it to digital form. In one embodiment, the signals output from ADC 215 are between 0 and about 1250 MHz signals and ADC 215 represents a pair of analog-to-digital converters for quadrature (I/Q) digitization. The digital output from ADC 215 is received by DSP 216. DSP 216 restores the amplitude and phase of the signal. DSPs 211 may provide demodulation, packet disassembly, de-interleaving and automatic gain control.

In one embodiment, each of the transceivers includes a controlling microprocessor that sets up control information for DSP. The controlling microprocessor may be on the same die as the DSP.

DSP-Controlled Adaptive Beam Forming

In one embodiment, the DSPs implement an adaptive algorithm with the beam forming weights being implemented in hardware. That is, the transmitter and receiver work together to perform the beam forming in RF frequency using digitally controlled analog phase shifters; however, in an alternative embodiment, the beamforming is performed in IF. Phase shifters $205_{0-N}$ and $211_{0-N}$ are controlled via control channel 208 and control channel 217, respectfully, via their respective DSPs in a manner well known in the art. For example, DSP 201 controls phase shifters $105_{0-N}$ to have the transmitter perform adaptive beamforming to steer the beam while DSP 211 controls phase shifters $211_{0-N}$ to direct antenna elements to receive the wireless transmission from antenna elements and combine the signals from different elements to form a single line feed output. In one embodiment, a multiplexer is used to combine the signals from the different elements and output the single feed line.

DSP 201 performs the beam steering by pulsing, or energizing, the appropriate phase shifter connected to each antenna element. The pulsing algorithm under DSP 201 controls the phase and gain of each element.

The adaptive beam forming antenna is used to avoid interfering obstructions. By adapting the beam forming and steering the beam, the communication can occur by avoiding obstructions which may prevent or interfere with the wireless transmissions between the transmitter and the receiver.

In one embodiment, with respect to the adaptive beam-forming antennas, they have three phases of operations. The three phases of operations are the training phase, a searching phase, and a tracking phase. The training phase and searching phase occur during initialization. The training phase determines the channel profile with predetermined sequences of spatial patterns $\{A_i\}$ and $\{B_j\}$. The searching phase computes a list of candidate spatial patterns $\{A_i\}$, $\{B_j\}$ and selects a prime candidate $\{A_0, B_0\}$ for use in the data transmission between the transmitter of one transceiver and the receiver of another. The tracking phase keeps track of the strength of the candidate list. When the prime candidate is obstructed, the next pair of spatial patterns is selected for use.

In one embodiment, during the training phase, the transmitter sends out a sequence of spatial patterns $\{A_i\}$. For each spatial pattern $\{A_i\}$, the receiver projects the received signal onto another sequence of patterns $\{B_j\}$. As a result of the projection, a channel profile is obtained over the pair $\{A_i\}$, $\{B_j\}$.

In one embodiment, an exhaustive training is performed between the transmitter and the receiver in which the antenna of the receiver is positioned at all locations and the transmitter sending multiple spatial patterns. Exhaustive training Is well-known in the art. In this case, M transmit spatial patterns are transmitted by the transmitter and N received spatial patterns are received by the receiver to form an N by M channel matrix. Thus, the transmitter goes through a pattern of transmit sectors and the receiver searches to find the strongest signal for that transmission. Then the transmitter moves to the next sector. At the end of the exhaustive search process, a ranking of all the positions of the transmitter and the receiver and the signals strengths of the channel at those positions has been obtained. The information is maintained as pairs of positions of where the antennas are pointed and signal strengths of the channels. The list may be used to steer the antenna beam in case of interference.

In an alternative embodiment, bi-section training is used in which the space is divided in successively narrow sections with orthogonal antenna patterns being sent to obtain a channel profile.

Assuming DSP 101 is in a stable state and the direction the antenna should point is already determined. In the nominal state, the DSP will have a set of coefficients that it sends the phase shifters. The coefficients indicate the amount of phase the phase shifter is to shift the signal for its corresponding antennas. For example, DSP 101 sends a set of digital control information to the phase shifters that indicate the different phase shifters are to shift different amounts, e.g., shift 30 degrees, shift 45 degrees, shift 90 degrees, shift 180 degrees, etc. Thus, the signal that goes to that antenna element will be shifted by a certain number of degrees of phase. The end result of shifting, for example, 16, 34, 32, 64 elements in the array by different amounts enables the antenna to be steered in a direction that provides the most sensitive reception location for the receiving antenna. That is, the composite set of shifts over the entire antenna array provides the ability to stir where the most sensitive point of the antenna is pointing over the hemisphere.

Note that in one embodiment the appropriate connection between the transmitter and the receiver may not be a direct path from the transmitter to the receiver. For example, the most appropriate path may be to bounce off the ceiling.

In one embodiment, when the transmission path being currently used becomes obscured, another path is searched for using a beam search procedure. While this can obtain an improved beam, it can also result in a temporary cessation of communication while the beam search procedure is occurring. Additionally, the communication may have degraded prior to the beam search or beam tracking operations. Thus, the wireless channel can experience outages due to the adaptive beam forming. The techniques described herein for media streaming are used for mitigating the impact of these outages.

An embodiment used for more information on adaptive beam forming is described in U.S. Application Ser. No. 11/706,711, entitled "Adaptive Beam-Steering Methods to Maximize Wireless Link Budget and Reduce Delay-Spread Using Multiple Transmit and Receive Antennas," filed on Feb. 13, 2007.

Partitioning and Post Processing

As discussed above, transmitter 140 and receiver 141 include modules 108 and 116, respectively. Partitioning module 108 packetizes each phase (partition) of the image-video data. In one embodiment, module 108 performs joint compression and packetization of video/image data optimized for the wireless streaming of the media. Compression refers to a process of removing redundancy inherent in most media data. Lossless image coding methods such as JPEG-LS derive their compression efficiency through a multitude of concepts. In another embodiment, module 108 performs packetization of the video/image data in its uncompressed form optimized for the wireless streaming of the media. Packetization refers to the packaging of the compressed (or non-compressed) bitstream (the phases, or partitions) for transmission over a (noisy) transmission medium or network. Generally, if conditions of the transmission medium are not good, fewer partitions are sent. Then, resolution adjustment can be used to compensate for the conditions.

Delivery of media steaming, especially for high-definition formats, requires large buffers since the transmitters need to buffer incoming streaming data during control signaling periods, multiplexing for multiple streams, or retransmission due to bad channel conditions. With a limited buffer, overflows severely damage the media quality. Transmitter buffer management in partitioning module 108 can maintain high media quality with a limited buffer by taking advantage of partitioning and receiver error concealment. When the buffer cannot accommodate the incoming packets, the buffer management proactively drops some media packets with a low priority in the buffer and leaves enough space for the next incoming packets. The proactive dropping can avoid error concealment failures resulting from data loss due to overflows and improves the efficiency of buffer use without noticeable media quality degradation. When the channel transmission capacity is lower than the media data rate, this mechanism is equivalent to source coding rate control.

Post processing module 116 performs actions in order to enhance the delivered quality at the display unit. Examples include error concealment of lost pixels through classical image processing methodologies such as nearest neighbor copying or pixel-domain interpolation (that can be spatial, temporal, or spatio-temporal) that can be arbitrarily sophisticated by leveraging the latest advances in image and video processing and noise-removal methodologies. In one embodiment, using the post processing module 116, the receiver is able to handle the data that the transmitter sends it, even if it is less than all the partitions through error or loss concealment.

If feedback from the receiver to the transmitter of which data is received and/or received correctly is available, then this can be used both to facilitate retransmissions as well as optimization of the choice of data to be transferred to further improve the performance of multi-media optimized streaming. If the receiver informs the transmitter which packets are correctly received, the transmitter and receiver can be in sync.

Packetization/Compression

Figures 3, 4:
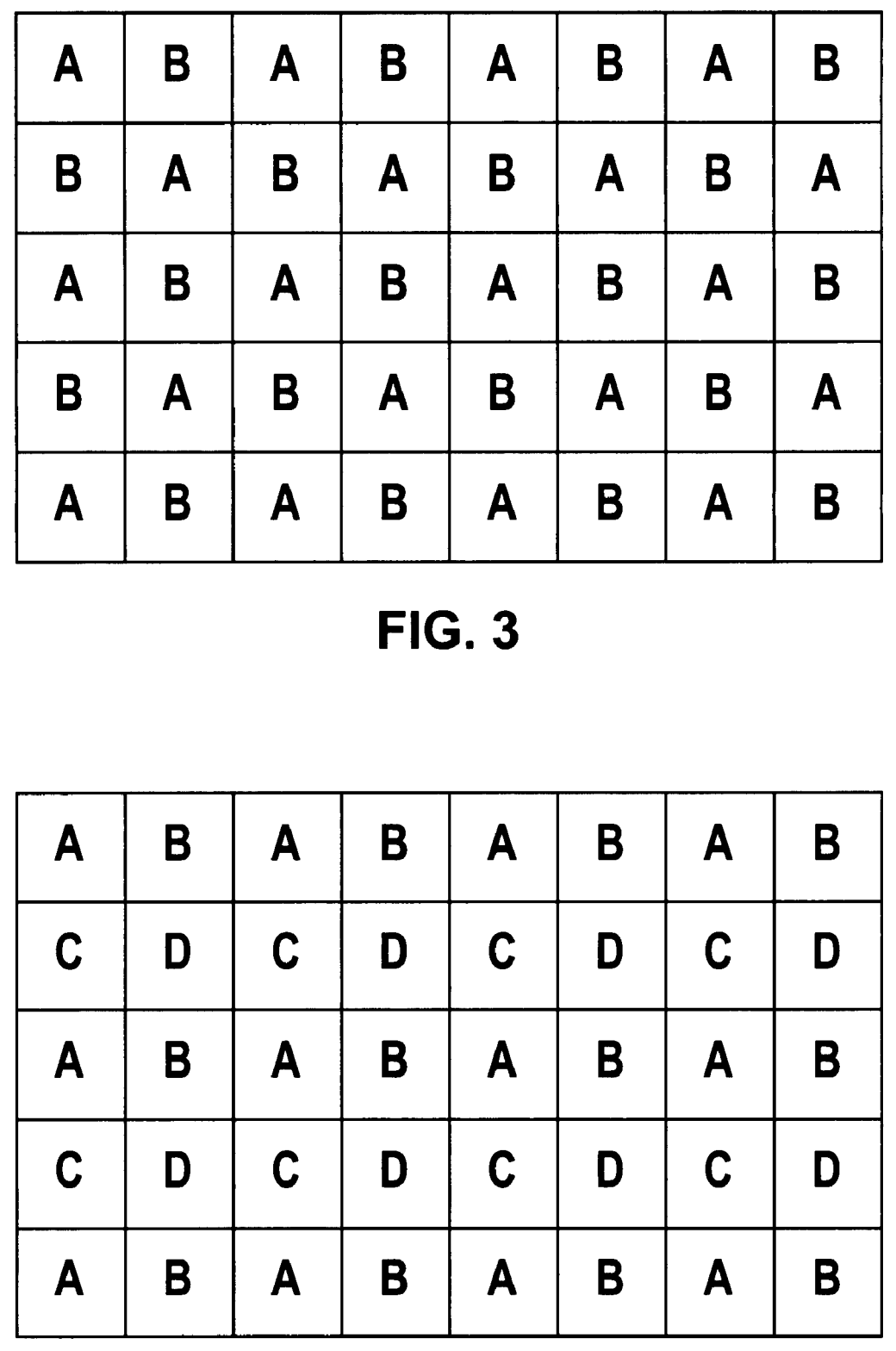

Packetization/compression module 108 allows for the compression and the packetization approaches at the application layer to be matched to each other and jointly made aware to receiver 141 via post-processing module 116. FIG. 3 illustrates one embodiment of an image frame for illustrating post-processing coupling. In this embodiment, the image frame is tiled into a "checkerboard" pattern having two phases (partitions) "A" and "B".

In one embodiment, the size of the phase units depicted as A and B respectively, can be selected as single pixels or small blocks. For example, the units corresponding to A and B may include single image pixels or arbitrarily sized image blocks. In other embodiments, the image frame could be extended to additional phases. For instance, FIG. 4 illustrates the image frame tiled into a "checkerboard" pattern having four phases "A", "B", "C" and "D".

In one embodiment, each of the phases are separately packetized (and compressed) at module 108 in order to control a trade-off between compression (e.g., maximized if image not separated into multiple phases) and robustness (e.g., leveraging diversity gains of receiving at least one phase correctly). Particularly, compression efficiency is potentially compromised by breaking up the image into its phases due to a more diluted neighborhood context that can be used for prediction. That is, the correlation stricture of the pixels transmitted under phase A independently is weaker than that in the composite case of transmitting phases A and B jointly.

However, the separate phase compression and packetization results in increased diversity or robustness. For instance, if certain pixels in the B phase are lost (e.g., due to intermittent losses induced in the beamformed wireless system that can have interruptions in channel usage), the pixels can be efficiently interpolated at the receiver from the neighboring pixels in phase A. Thus, the system may be adjusted to trade off compression efficiency for robustness, with a diversity gain induced by the number of phases.

According to one embodiment, sub-sampling ratios of an image frame may be further be tailored in the case of color images and image sequences, to indicate whether the image frame is a luminance frame or a chrominance frame (e.g., Y—Cr-Cb format). In such an embodiment, the chrominance components are sub-sampled more aggressively since these components are more predictable.

In a further embodiment, compression/packetization module 108 implements a prioritized transmission order to transmit and packetize the media content. In this embodiment, phase A of the image frame in FIG. 3 is prioritized over phase B. Thus, phase A is transmitted with maximal reliability, while phase B is transmitted if there is sufficient bandwidth and/or time depending on the latency constraint.

Adaptive transmission order can be implemented in a phase (partition) scheduler in partitioning module 108 that is in charge of determining the serving order of those phase (partition) queues in which the corresponding phases (partitions) are stored. The scheduler first calculates the scheduling weight for each head-of-the-line phase (partition) packet based on its phase priority, delay, play deadline, queue length, and the current channel conditions, and then chooses the head-of-the-line packet with the largest weight to serve. The weight calculation is to maximize the media quality and robustness. For example, a higher delay results in a higher weight, and with bad channel conditions the scheduler lowers some phase (partition) queues' priority to fit the channel capacity.

In case phase B is not received, en-or-concealment strategies (discussed in more detail below) can be invoked at post processing module 116. Accordingly, it is possible to ensure that the signal reconstruction quality at receiver 141 would be minimally compromised due to the superior interpolation possibilities that leverage the presence of phase A. In uncompressed partitioning systems, it is possible to reconstruct a region of the image at some quality with any one or more of the phases present. All of the partition dropping and transmission ordering techniques described herein can apply equally well to the uncompressed as compressed cases.

The prioritized transmission order minimally affects the overall compression efficiency. For example, while the compression efficiency of phase A may somewhat be effected as compared to an embodiment with no prioritized transmission, the loss is recovered by compressing phase B more efficiently. This is done by compressing phase B by leveraging the presence of the higher priority phase A samples at receiver 141.

For example, in the presence of a feedback link, it is possible to guarantee that no phase B packets for a video frame is transmitted unless all of the phase A packets have been reliably delivered, thereby ensuring the presence of phase A samples at receiver 141. Phase B data can subsequently be compressed more efficiently than a classical JPEG-LS style compression framework that exploits only a causal prediction neighborhood. Due to the presence of a richer non-causal prediction context, the phase B data can be compressed extremely efficiently. Thus, prioritization results in a highly efficient transmission order that combines efficiency with robustness by leveraging the image structure at receiver 141.

The above-described prioritization schemes are relevant not only due to a fluctuating channel capacity pipe (due to the transmission environment) but also due to the variable bit rate nature of natural video sequences, as well as a demand to break up image frames into smaller sizes for packet transmission. That is, there can be a wide variance in the bit rate requirements for video frames (e.g., typical video sequences comprise "high action" and "low action" frames as well as high-action and background components in each frame). In such cases, it may be expensive or infeasible to "smooth out" the potentially large variations of the frame bit rate requirements, as the buffering requirements as well as the induced delays could be unacceptable. In such scenarios, there may be scenarios where it is not possible to send all the data, and prioritization choices have to be made.

The above-described prioritization mechanism performed by module 108 may be further coupled with physical layer attributes. For example, in beamforming-based wireless transmission systems, there are well-known tradeoffs at the physical layer between multiplexing gain (deliverable bit rate) and diversity gain (robustness level). In one embodiment, these parameters are matched to the QoS parameters of the content. For example, the higher-priority packet stream of phase A can receive increased diversity gain, or higher signal power in order to transmit it more reliably. This may occur in scenarios involving multi-antenna adaptive beam-forming where there can be interruptions in multi-path signal strengths, and periods where the channel does not work very well. In such cases, when the capacity is fluctuating, it is imperative to get the prioritized phase A data through, and do "best effort" for phase B.

In another embodiment, the prioritization of the application content (QoS levels) can be matched with prioritized signal power allocation in addition to the diversity-multiplexing tradeoffs of the multi-antenna system when transmitting higher-priority packet content (e.g., phase A packets). This would allow for an unequal power allocation at the physical layer that is efficiently matched to the importance of the content being delivered.

In addition to beamforming patterns and varying signal power that is matched to the QoS level of the content, it is possible to vary the strength of the physical layer FEC code needed to combat channel loss, in accordance with the priority of the content. For example, in the above-described prioritized transmission scheme, it is possible to tune the strength of the FEC code to the QoS parameters of the media content (e.g., higher-priority phase A can get a stronger code).

In embodiments where feedback is available to indicate which packets were delivered correctly or incorrectly, it is possible to jointly exploit this information with the mechanisms described above. For example, it is possible to prioritize the more important packets to be retransmitted, or to use this feedback information to adapt the scanning, compression, and transmission strategies "on the fly." For instance, phase A packets can be re-transmitted with higher priority (using any or all of the described prioritization methods) over those of phase B in the face of time deadlines (e.g., the time by which content must be output for display on a display device).

In one embodiment in which uncompressed data is being transmitted, every video block receives a fixed number of retransmissions that are prioritized according to the importance of their content (e.g., phase A versus phase B) in a manner that maximally exploits the error-concealment strategy at the decoder. That is, retransmissions of lost packets can be executed in a prioritized order that couples the QoS parameters of the content to the error-concealment strategy at the decoder. In this manner, the likelihood of correctly transmitting the phase A blocks is improved.

In addition to prioritization into multiple signal phases (as in FIGS. 3 and 4), other embodiments may alternate multi-resolution decompositions or coarse-to-fine representations of the media content. For instance, in the case of FIG. 3, in addition to sending pixels corresponding to phase A and phase B separately (in the raw pixel domain), it is possible to send a "coarse" version (e.g., (A+B)/2 which represents a crude average) and a "detail" version (the difference (A−B)) with lower priority. In such an embodiment, the coarse version would have a higher priority. An advantage of this approach is the possibility of a superior interpolation strategy at the receiver due to the presence of a "high-quality" coarse representation of the media. This decomposition can be done with minimal increase in complexity, possibly increased compression efficiency, and improved error-concealment potential resulting in a superior delivered quality at receiver 141.

In one embodiment, transmitter 140 determines that when losses are high and/or bandwidth supported by the channel is lower, in efforts to assure that all blocks' higher priority phases (i.e. phase A) patterns get through, the transmission of lower priority blocks (i.e. phase B) can be suppressed in part or entirely. Thus, resolution shifting may occur when the transmitter 140 encounters a worse channel, and transmitter 140 automatically only transmits the phase A blocks and receiver 141 can reconstruct into a lower resolution version. Since receiver 141 is already designed to handle reconstruction and error concealment when some of the phases are missing, this resolution shifting can be done using the standard error concealment techniques.

Post Processing

According to one embodiment, post processing module 116 interpolates a missing pixel in one phase from pixels in other phases and/or other pixels in the same phase. For instance, a missing pixel in phase B could be interpolated by a simple average of the four abutting pixels in phase A.

Alternatively, the missing pixel can be interpolated by an average of the four diagonally adjacent pixels in phase B if individual pixels errors can be detected. In a packetized system where entire packets are detected as present or absent, all of the pixels in phase B can be interpolated from all of the pixels in phase A for a given block if the packet including all of the data for the phase B portion of the block is deemed missing. In scenarios where the phase B data is received but phase A is not, phase A pixels could be reconstructed from phase B pixels.

Further, error-concealment techniques may be implemented that are tightly coupled with the compression and transmission mechanisms discussed above with respect to packetization/compression module 108. For example, in the presence of a multi-resolution, it is possible to use both a spatial context but also generalize this to 3-D concealment strategies (e.g., 3-D checkerboards involving spatial and temporal dimensions). For instance, checker-board patterns are retained over time, where the A and B phases alternate between consecutive frames, allowing for maximal exploitation of the inherent spatio-temporal correlation structures in video sequences.

Such sophisticated error-concealment methods may involve excessive amounts of buffering that may not be feasible in some small-buffer constraint applications. In such cases, where a limited buffer is available, it may be possible to include a "coarse" version of the previous frame in the temporal interpolation context in order to approximate the performance of a full-buffer system. For example, it may be possible to enhance the spatial interpolation schemes of FIGS. 3 and 4, with the presence of a coarse temporal frame.

The joint packetization/compression mechanism discussed above allows for very low complexity and low buffer requirement constraints, making it extremely attractive to a number of application scenarios involving media transmission and streaming over wireless networks and other communication mediums characterized by intermittent connectivity, e.g. as found in wireless networks with high degrees of fading, or in multi-antenna physical layer wireless systems.

Figure 5:
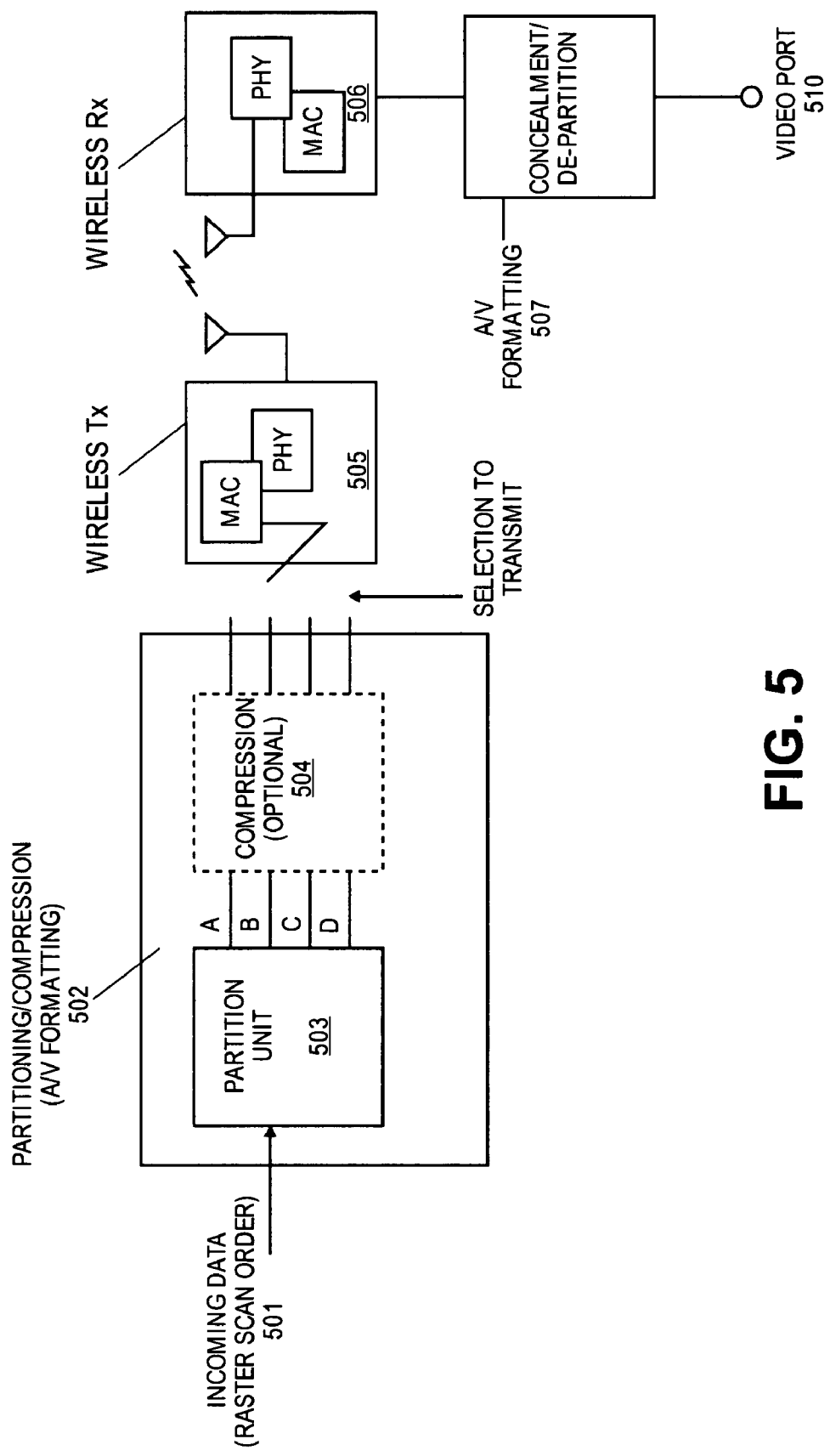
FIG. 5 illustrates more detailed embodiment of the partitioning and partition scheme.

FIG. 5 illustrates more detailed embodiment of the partitioning and phase scheme described above. Referring to FIG. 5, incoming data 501 is received by the partitioning and compression block 502 to perform AV formatting. In one embodiment, the incoming data arrives in raster scan order. Note that in other embodiments, partitioning and compression block 502 does not perform compression.

Partition unit 503 partitions the incoming data into a number of phases, A-D in this example. The wireless transmitter 505 selects among the phases to transport base on the prioritizations described above. In one embodiment, the packet scheduler controls the selection and causes the PHY to initiate the transmission of the video data.

Receiver 506 receives the wireless transmission via its PHY and its MAC sends the data to undergo AV formatting (concealment/departitioning) using AV formatting block 507 to produce an output on video port 510).

Selection to transmit a particular phase is based on the prioritized transmission order described above as well as, in one embodiment, feedback received from the receiver 506 on a feedback channel, such as shown in FIG. 1. Feedback channel allows the receiver to tell the transmitter what it has received.

In one embodiment, the MAC allows performing reordering of the data to be transmitted to transmit different streams of the various phases A-D.

Figure 6:
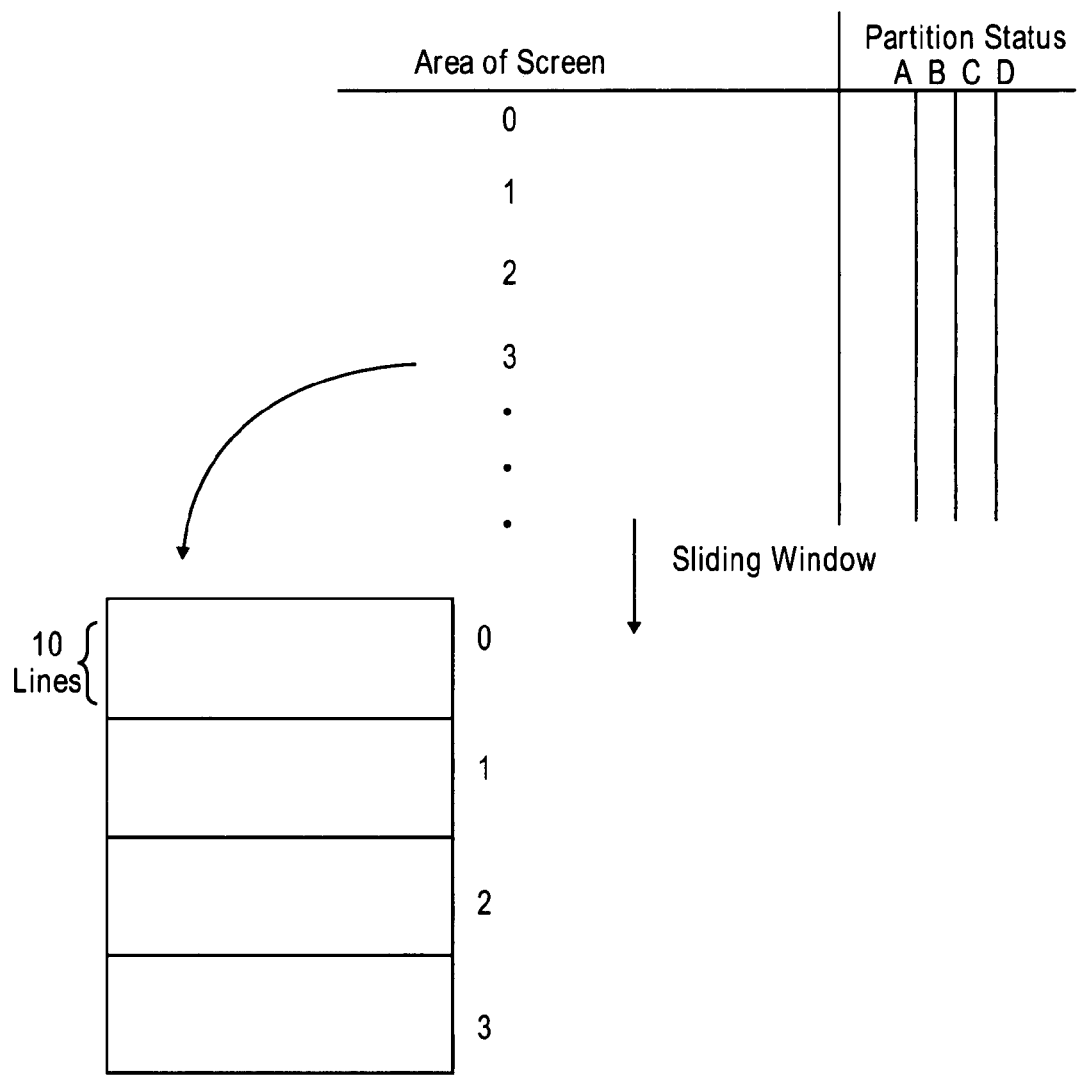
FIG. 6 illustrates an example a table stored in memory of the transmitter to keep track of which partitions have been sent for each area of the screen.

The partitioning unit block 502 keeps track of which phases have been sent. In one embodiment, the transmitter buffer management described above and the packet scheduler are contained in the partition unit 503. FIG. 6 illustrates an example a table stored in memory of the transmitter to keep track of which phases have been sent for each area of the screen. In one embodiment, the screen is divided into sets of rows. In one embodiment, there are four portions of the display and each portion has ten rows of lines in it. Using the feedback, the transmitter is able to update the phase status for each area of the screen and based on what data has been sent and the timing that is required to transmit the data, the transmitter can decide which phases have priority for sending to the receiver.

In one embodiment, the priority is based on the timing by which the receiver must send the data to the video port. This time is limited and is usually based on the amount of time the video is displayed on the screen. The timing between the time at which incoming data is received to the time that data is output on the video port is based on timestamps that are associated with the data that is received. Because of clock synchronization, the transmitter can determine when the time stamp is able to determine when the receiver is expected to play the packet out. That is, there is only a certain amount of time from the time the incoming video data 501 is received to the time it must be output on video port 510. Thus, for each area of the screen, the transmitter obtains an indication of which phases have been sent and the area of the screens operate as a sliding window such that the phases states are maintained for the area of the screen until that area of the screen is to be replaced with the next set of data that is to be display on that portion of the screen. In one embodiment, the prioritization determines which phases get transmitted and this may be based on minimizing the minimum number of phases received the by the receiver for any part of the screen. In another embodiment, the prioritized transmission is based on maximizing the minimum number of phases in these parts. As an area is about to expire, prioritization may be based on that ensuring there is a certain level of coverage of that area of the screen. This can be a problem in adaptive beam forming systems where there may be interruption in the beam and after transmission begins again a prioritization is critical to insure that areas that are about to expire on the screen have data to be presented. In essence, the older data can cause an urgency to have its partitions sent to the receiver for display.

In one embodiment, rate selection is tied into the urgency for delivery of data such that, for example, if the channel only supports half the data rate, then only half the phase data may be sent. That is, based on the data rate available, the amount of phase data that is transmitted is controlled.

Note that as far as the receiver is concerned, its concealment system allows the receiver to utilize the data it does receive to generate the display. The receiver determines whether it needs to interpolate data based on the data it has received, or take other actions which are necessary to display the video. In one embodiment, the concealment techniques that are used are referred to as edge aware concealment techniques.

Also shown in partitioning block 502 is compression block 504 which is optional. The compression may be performed as described above.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A system comprising:
    a transmitter comprising
        a phased-array antenna to wirelessly transmit video or image data using beamforming, and a first module coupled to the phased-array antenna to packetize phase units of an image frame of the video or image data and to determine a prioritized transmission order to transmit the packetized phase units using the phased-array antenna, wherein each of the phase units is a portion of the image frame; and a receiver to receive the packetized phase units from the transmitter, the receiver having a post processing module to perform error concealment on data in received packetized phase units.

2. The system defined in claim 1 wherein the first module drops phase unit packets having a lower priority than the phase unit packets being transmitted with the phased-array antenna.

3. The system defined in claim 1 wherein the first module calculates a weight for each packetized phase unit at an output of each of a plurality of queues and selects one packetized phase unit to transmit from one of the plurality of queues based on the weight.

4. The system defined in claim 1 wherein the first module selects one packetized phase unit to transmit from a group of packetized phase units at a head of each of a plurality of queues to transmit based on at least one parameter from a set of parameters.

5. The system defined in claim 4 wherein the set of parameters includes one or more of a group consisting of: phase priority, delay, play deadline for a phase, queue length, and current channel condition.

6. The system defined in claim 1 wherein the transmitter further comprises a MAC and a physical layer, the MAC to control the selection of packetized phase units and cause the PHY to initiate the transmission of the video or image data.

7. The system of claim 1 wherein the first module prioritizes a first set of phase units to be packetized and transmitted prior to a second set of phase units.

8. The system of claim 7 wherein no phase units of the second set are transmitted until all of the phase units in the first set present in the partition transmission buffers have been transmitted.

9. The system of claim 7 wherein the post processing module interpolates missing portions of the image in the second set of phase units using data from the first set of phase units.

10. The system of claim 7 wherein the post processing module interpolates missing portions of the image in the second set of phase units by averaging a diagonal of pixels in the second set of phase units surrounding each missing portion.

11. The system of claim 1 wherein the transmitter further comprises:
a processor coupled to the first module;
a baseband signal processor coupled to the processor and the phased array beam forming antenna; and
a wireless communication channel interface coupled to the processor.

12. The system of claim 11 further comprising:
a media receiver; and
a media receiver interface coupled between the media receiver and the first module.

13. The system of claim 11 wherein the receiver further comprises:
a processor coupled to the post processing module;
a baseband signal processor coupled to the processor and the phased array beam forming antenna; and
a phased array beam forming antenna coupled to the baseband signal processor.

14. A system comprising:
a transmitter comprising
a phased-array antenna to wirelessly transmit media data using beamforming, and
a first module coupled to the phased-array antenna to packetize phase units of media data and to determine a prioritized transmission order to transmit the packetized phase units using the phased-array antenna;
a receiver to receive the packetized phase units from the transmitter, the receiver having a post processing module to perform error concealment on data in received packetized phase units; and
a unit to keep track of which phase units have been sent to the receiver for different areas of the screen.

15. The system defined in claim 14 wherein the receiver sends feedback to the transmitter regarding received phase units and the unit updates states for said different areas of the screen based on the feedback.

16. A system comprising:
a transmitter comprising
a phased-array antenna to wirelessly transmit media data using beamforming, and
a first module coupled to the phased-array antenna to packetize phase units of media data and to determine a prioritized transmission order to transmit the packetized phase units using the phased-array antenna;
a receiver to receive the packetized phase units from the transmitter, the receiver having a post processing module to perform error concealment on data in received packetized phase units, wherein the first module jointly compresses and packetizes all units of a first phase of the media data and jointly compresses and packetizes all units of a second phase.

17. A system comprising:
a transmitter comprising
a phased-array antenna to wirelessly transmit media data using beamforming, and
a first module coupled to the phased-array antenna to packetize phase units of media data and to determine a prioritized transmission order to transmit the packetized phase units using the phased-array antenna;
a receiver to receive the packetized phase units from the transmitter, the receiver having a post processing module to perform error concealment on data in received packetized phase units, wherein the first module prioritizes a first set of phase units to be packetized and transmitted prior to a second set of phase units, wherein the prioritization of the first set of phase units by the first module is matched with a prioritized signal power allocated by the phased array beam forming antenna.

18. A transmitter comprising:
a phased-array antenna to wirelessly transmit video or image data using beamforming, and
a first module coupled to the phased-array antenna to packetize phase units of an image frame of the video or image data and to determine a prioritized transmission order to transmit the packetized phase units using the phased-array antenna, wherein each of the phase units is a portion of the image frame.

19. The transmitter defined in claim 18 wherein the first module drops phase unit packets having a lower priority than the phase unit packets being transmitted with the phased-array antenna.

20. The transmitter defined in claim 18 wherein the first module calculates a weight for each packetized phase unit at an output of each of a plurality of queues and selects one packetized phase unit to transmit from one of the plurality of queues based on the weight.

21. The transmitter defined in claim 18 wherein the first module selects one packetized phase unit to transmit from a group of packetized phase units at a head of each of a plurality of queues to transmit based on at least one parameter from a set of parameters.

22. The transmitter defined in claim 21 wherein the set of parameters includes one or more of a group consisting of: phase priority, delay, play deadline for a phase, queue length, and current channel condition.

23. The transmitter defined in claim 18 further comprising a MAC and a physical layer, the MAC to control the selection of packetized phase units and cause the PHY to initiate the transmission of the video or image data.

24. A transmitter comprising:
  a phased-array antenna to wirelessly transmit media data using beamforming;
  a first module coupled to the phased-array antenna to packetize phase units of media data and to determine a prioritized transmission order to transmit the packetized phase units using the phased-array antenna; and
  a unit to keep track of which phase units have been sent to the receiver for different areas of the screen.

25. The transmitter defined in claim 24 wherein the first module drops phase unit packets having a lower priority than the phase unit packets being transmitted with the phased-array antenna.

26. The transmitter defined in claim 24 wherein the transmitter further comprises a MAC and a physical layer, the MAC to control the selection of packetized phase units and cause the PHY to initiate the transmission of the media data.

27. The transmitter defined in claim 24 wherein the first module jointly compresses and packetizes all units of a first phase of media data and jointly compresses and packetizes all units of a second phase.

28. The transmitter defined in claim 24 wherein the first module prioritizes a first set of phase units to be packetized and transmitted prior to a second set of phase units.

29. The transmitter defined in claim 28 wherein no phase units of the second set are transmitted until all of the phase units in the first set present in the partition transmission buffers have been transmitted.

30. The transmitter defined in claim 28 wherein the prioritization of the first set of phase units by the first module is matched with a prioritized signal power allocated by the phased array beam forming antenna.

31. The transmitter defined in claim 28 wherein the post processing module interpolates missing pixels in the second set of phase units.

32. The transmitter defined in claim 24 further comprising:
  a processor coupled to the first module;
  a baseband signal processor coupled to the processor and the phased array beam forming antenna; and
  a wireless communication channel interface coupled to the processor.

* * * * *